United States Patent [19]

György et al.

[11] 4,276,244
[45] Jun. 30, 1981

[54] PACKING OF EQUIPMENT FOR THE PURPOSE OF CONTACTING MAINLY GASEOUS AND LIQUID MEDIUMS

[75] Inventors: Fábry György; István Takács, both of Budapest, Hungary

[73] Assignee: Richter Gedeon Vegyeszeti Gyar Rt., Budapest, Hungary

[21] Appl. No.: 74,779

[22] Filed: Sep. 12, 1979

Related U.S. Application Data

[62] Division of Ser. No. 892,258, Mar. 31, 1978, Pat. No. 4,215,083.

[30] Foreign Application Priority Data

Apr. 27, 1977 [HU] Hungary ................. RI 628

[51] Int. Cl.³ ............................................. B01F 3/04
[52] U.S. Cl. ................................... 261/155; 202/158; 250/527; 261/1; 261/81; 261/110; 261/141
[58] Field of Search ................. 261/1, 62, 81, 82, 112, 261/114 VT, 114 JP, 152, 153, 155, 143, 148, DIG. 48, 141; 137/512.15; 138/46; 202/158; 422/198; 250/527

[56] References Cited

U.S. PATENT DOCUMENTS

| 2,833,527 | 5/1958 | Kohl et al. ............................ 261/148 |
| 3,246,887 | 4/1966 | De Goederen ............... 261/114 VT |
| 3,325,155 | 6/1967 | Bahout .......................... 261/114 VT |
| 3,445,095 | 5/1969 | Braun et al. .................. 261/114 VT |
| 3,589,689 | 6/1971 | English .......................... 261/114 JP |
| 3,770,255 | 11/1973 | Nutter .......................... 261/114 VT |
| 3,792,843 | 2/1974 | Stage ................................. 261/153 X |
| 4,004,609 | 1/1977 | Fabry et al. ............. 261/114 VT X |
| 4,088,716 | 5/1978 | Stoev et al. ...................... 261/81 X |
| 4,096,214 | 6/1978 | Percevaut et al. ............. 261/112 X |

FOREIGN PATENT DOCUMENTS 577204 6/1959 Canada ..................................... 261/148
394059 1/1974 U.S.S.R. ..

Primary Examiner—Richard L. Chiesa
Attorney, Agent, or Firm—Karl F. Ross

[57] ABSTRACT

The packing of a tower or column for heat exchange, material exchange, contacting of two fluids with one another and chemical reaction consisting of a stack of elongated members having two walls inclined to one another and joined at a third wall, the first two walls being each formed with elongated vibratile elements interdigitated with vibratile elements of another packing member so that when the body of packing is traversed by one or more fluids, the vibratile elements are set into vibration.

9 Claims, 11 Drawing Figures

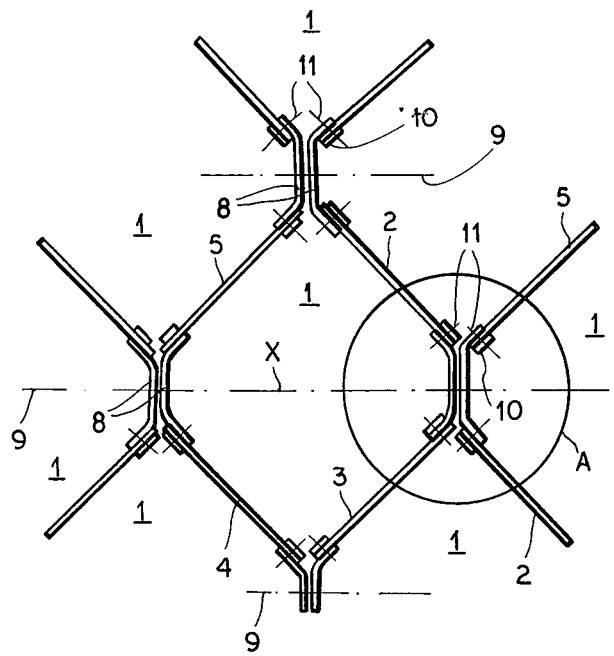
FIG.2
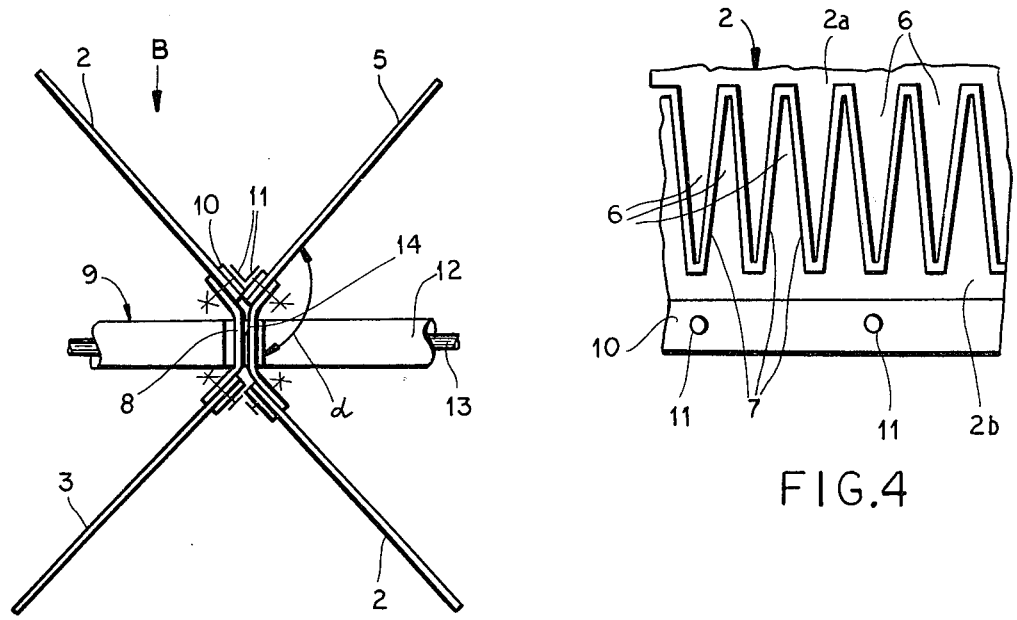
FIG.3
FIG.4

PACKING OF EQUIPMENT FOR THE PURPOSE OF CONTACTING MAINLY GASEOUS AND LIQUID MEDIUMS

CROSS REFERENCE TO RELATED APPLICATION

This application is a division of our copending application Ser. No. 892,258, filed Mar. 31, 1978, now U.S. Pat. No. 4,215,083 issued July 29, 1980.

FIELD OF THE INVENTION

The invention relates to packing to be used in equipment for contacting mainly gaseous and liquid mediums. Such equipment includes columns used in the pharmaceutical and chemical industry for distillation, absorption, chemical reaction, spray-catching, wet-gas purification, gas-washing, etc. Several industrial sectors are in need of cooling towers, heat exchangers, droplet separation units, dust control units, and apparatus for the introduction of oxygen into waste water in sewage purification. All these tasks require the contacting of liquid and gaseous mediums.

BACKGROUND OF THE INVENTION

Column for contacting gaseous and liquid mediums have been known for decades. In certain cases empty vertical columns were used, in which the liquid was poured down pellicularly on the internal mantle surface or was sprayed into the column, thus bringing about the contact with the upflowing gas. Naturally the effectiveness of this method was very low.

At the present time plate or packed towers are used for chemical and industrial distillation purposes.

The plate-type towers can be of two main groups, as follows: counterflow (shower) plate-and crossflow (overflow) plate columns.

An advantage of the plate columns is that there are practically no difficulties in connection with the liquid and gas distribution; on the other hand their drawback is the high specific pressure loss, involving high energy consumption. In addition their loadability and flexibility adaptation to varying operating conditions, are limited.

Small-size packing bodies independent from each other are generally used as a packing for the packed towers; the packing of such towers have also recently been in the form of inserts made of mesh tissue The packings of mesh tissue consist of small cross sectional channels made of such material, placed vertically in the tower; the packing can also use a contacting device made of mesh tissue panels crossing each other at an angle filling out the interior of the tower.

The column packing of such packing bodies is formed mostly by a loose, irregular mass of such bodies, but packings of regular packing bodies too are known; in this case the packing bodies are in a regular geometrical arrangement in the column.

The presently known and used packing bodies differ from each other mainly with respect to their shape, the purpose of all the packing varieties being identical: placing mainly large-size bodies into the column, a uniform cavity formation should be realized, ensuring large voids volume, and sufficiently large specific contact surface by the use of inexpensive packing bodies which give a compact apparatus (small equipment dimensions at high effectiveness).

Since a uniform liquid and gas distribution cannot be properly ensured in presently known packed columns, ineffective slack spaces (dead area) or zones barely participating in the necessary phase-contact develop within the packing aggregate. The packings are very sensitive to solid (floating) impurities, clog easily, and cleaning is very complicated. These factors limit the applicability of the packed columns to a certain degree. Packings built up in a regular shape from packing bodies, can be generally used only in certain special technical fields (e.g. at vacuum distillation).

Effectiveness (volume) of the lattice works used in conventional the cooling towers is relatively low, the volume to be built in is specifically very large.

The introduction of oxygen into water waste water purification, or generally in the field of water treatment is an important task. For this purpose the oxygen is generally bubbled through the water, and/or the surface layers of the water are mixed or atomized with mechanical agitator (rotor), whereby the surface area of the water is increased and induction of the oxygen from the air is facilitated. The effectiveness of these methods is very low and the procedures are expensive; however their application in water treatment is indispensable.

Summing up, in can be stated, that at the present time there is contacting equipment known, which would be able to ensure effectively the contact of the two phases—gas (vapour) and liquid—in case of low phase flow at acceptable production and operation cost.

OBJECT OF THE INVENTION

Purpose of the invention is to give such improved packing for equipment for the contacting of gaseous media of simple construction and production technology, which can be easily installed in a column or in other (e.g. cross flow) equipment, has a small space requirement, ensures maximally effective contact—high material—and heat transfer velocity—with optimal energy management, and is successfully applicable in the most diversified technical fields for solving the most different problems even under varying operating conditions (e.g. both very little and very extensive sprinkling).

SUMMARY OF THE INVENTION

The invention is based on the discovery that the intensity of contacting of the gas (vapour) and liquid, and thereby the velocity of the material and/or that of the heat transfer can be considerably increased when the packing consists of cells surrounded by walls containing vibrating elements which vibrate during the flow of the mediums, or consists of plates containing vibrating elements, disposed in the vicinity of each other, and that the equipment can be economically built, if these elements being brought into vibration as a result of the mediums flowing through the packing and remaining in vibration until the flow is discontinued. Since the vibrating elements intensively atomize the liquid in the region of the surface of cell walls, or plates, the liquid particles knocked off the nearby plates collide with each other, so that a secondary atomization takes place. On the other hand the medium passing by is induced into a swirling, turbulent motion within the cells. Hence contact of the gas and liquid takes place over a very large surface while in powerful motion, with maximum effectiveness.

The object of the invention is thus attained with a packing formed by cell or cells transmitting the mediums, surrounded by walls crosswise to the flow direction of at least one medium. A least two walls of each cell being constructed so that it can be brought into vibration by flow of the gaseous or/and liquid medium. These walls have console-type elements held in vibration and provided with gaps between them.

The console-type elements are formed by teeth made of flexibly deformable plate material and/or by strands made of bar, wire, or similar material.

According to an advantageous invention principle the packing consists of cells joined in a honeycomb structure. It is practicable if the cells of the honeycomb are of hexagonal cross sectional shape inside hollow, prism-shaped structures, disposed in the interior of a rectangular column, the four walls of which contain like console-type elements.

If the packing is used in a surface heat exchanger, a pipe extends into the cells for the conveyance of a flowing medium.

On the other hand, if the packing is used to a photochemical reactor, burners surrounded by glass- or quartz tube are placed in the cells.

The packing can be used in equipment for contacting the liquid and gaseous mediums, in which case the packing unit contains several open contacting channels arranged above and/or next to each other. There are console-type elements in at least two walls of the channels to be brought into and kept in vibration by the flow of the gaseous or/and liquid mediums, provided with gap between them. The channel axes parallel to the channel walls in the adjacent packing units are crosswise to each other. The console type elements are formed even in this case by flexibly deformable teeth of plate material, or/and by strands of bar, wire or similar material.

A fundamental advantage of the packing according to the invention is that it ensures maximal contacting effectivenss through optimal energy management, atomization induced by vibration of the console elements, and swirling, turbulent motion within the cells, significantly intensifying the material- and/or heat transfer processes between the mediums. Vibration of the console-type elements is attained without additional external energy input: the only energy utilized is that which is absolutely necessary to convey the contacting medium into the packing, the two phases (liquid and gaseous) in flow impart the impulses to the console type elements without any other intervention (e.g. mechanical vibration), by which their vibration is induced.

A further advantage is that the structural design of the packing, by comparison with the technologically complicated methods currently used creating packings of more and more complicated shape and structure is very simple, and it is of light weight. Consequently besides the low operating costs, in relation to the attained result, of the equipment containing the packing according to the invention, the investment costs are also low. In addition, as a result of high effectiveness, packings with smaller space demand than usual—thus contacting equipment of smaller size can be sufficient for solving the given task.

An extremely advantageous property of the packing according to the invention is the lack of slack spaces, due to the constant vibration, the solid (floating) impurities do not represent a clogging danger. While the packing is suitable for the realization of practically every kind of contacting task, (heat exchange, absorption, drop catching, gas purification, condensation, evaporation, distillation, procedure of chemical reactions, oxygen induction into waste water, etc., these uses can be effective even under varying operative conditions (e.g. both very little and very extensive sprinkling).

BRIEF DESCRIPTION OF THE DRAWING

In the Drawing

FIG. 2 is a detail in vertical cross section of a honeycomb-shaped packing built up from several cells;

FIG. 3 is an enlarged view of detail A in FIG. 2.

FIG. 4 is a view in the direction of arrow B, of FIG. 3.

SPECIFIC DESCRIPTION

Figure 1:
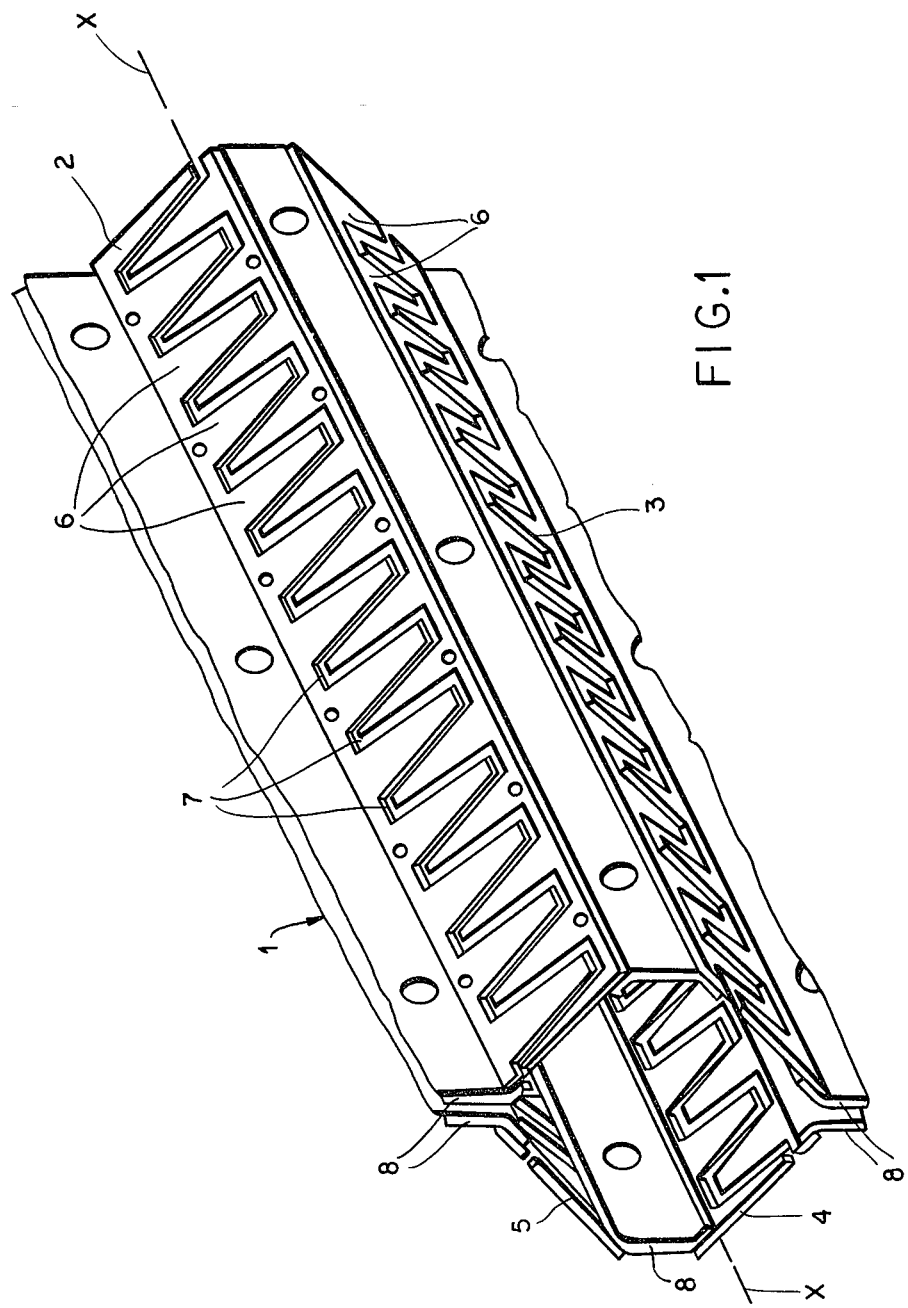
FIG. 1 is a perspective view of the packing according to the invention, formed by a single cell.

As shown in FIG. 1, the packing according to the invention may be formed by a single cell 1, which in the illustrated embodiment is formed by a hexagonal cross section, inside a hollow prismatic body. The four walls 2, 3, 4, 5 of cell 1 contain 6 teeth made of flexibly deformable material, there teeth being separated from each other by clearances 7, collectively forming a continuous sawtooth gap. These teeth 6, which are cut out in a sawtooth shape from the flexibly deformable material of the plates forming the cell walls, make up the elements that can be brought into and kept in vibration by flow of the medium. The sawtooth shaped rows of teeth face each other, the tooth tips reaching into the gaps between the teeth of the opposite row of teeth. Cell walls 2, 3, 4, and 5 carrying the vibratory elements, i.e. teeth 6, are fixed to the profile holding plates by screws, while the holding plates are fixed to one of the walls of a distillation column, to lock the cell 1 at its two ends at the same time. In this case the geometrical centerline x of cell 1 is horizontal, and either in case of counterflowing, or crossflowing contacting equipment, walls 2, 3, 4, and 5 are transverse to the flowing medium.

However, packing consisting of a single cell is used very rarely and only in special cases. Generally the packing is a cellular structure of honeycomb configuration as shown in FIG. 1. In another arrangement several cells are disposed next to each other. A cross section, i.e. a section at right angle to the x geometrical longitudinal axis of the prismatic cell, with a honeycomb structure consisting of several cells, is shown in FIG. 2. Since the structure is built up from the cells according to FIG. 1, the reference numerals used there are applicable to FIGS. 2 to 4 as well. The fastening-spacer device of cell 1 in FIG. 2 is represented by a dash-and-dot line at 9. Cell walls 2-5 are joined to holding plates 8 with clamp plates 10 and screws 11.

An enlarged view of junction point A of the FIG. 2 is shown in FIG. 3. The fastening-spacer device 9 here illustrated consists of spacer pipes 12 within each cell 1, and of holding bars 13 within the spacer pipes fixed to the walls of the column and from which a row of cells is suspended. The lengths of the spacer pipes are identical to the maximal horizontal width of each cell 1, i.e. to the distance between each two holding plates 8, facing each other. Holding plates 8 are composed of bent out U-shaped strips with shanks turned away from one another, with rings 14 disposed between them where the holding bars 13 are led through the holding plates. The fixing plates 10 are formed by plate strips. Angle $\alpha$ of the planes of walls 2, 3, 4, and 5 to the vertical can be between $-91°$ and $179°$, as required. Generally it is preferred to use an angle of around $135°$.

In the embodiment of FIG. 4, wall 2 is assembled from two plate sections 2a, 2b; the plate sections are fixed to the profile holding plates 8, with fixing plates 10, and screws 11, so that the teeth 6 of plate section 2a reach into the tooth gaps of plate section 2b and vice versa. There are gaps 7 between the adjacent teeth 6. In this embodiment plate sections 2a and 2b are in the same plane so that all the teeth 6 are in the same plane. However it is also possible to provide plate sections 2a and 2b so that the rows of teeth facing each other are in planes parallel to each other with a spacing of the planes not in excess of 10 mm or to dispose plate sections 2a, 2b with the planes of the rows of teeth facing each other are at an angle not exceeding $10°$.

Teeth 6 can be made from steel, bronze, or plastic plate.

Figure 5:
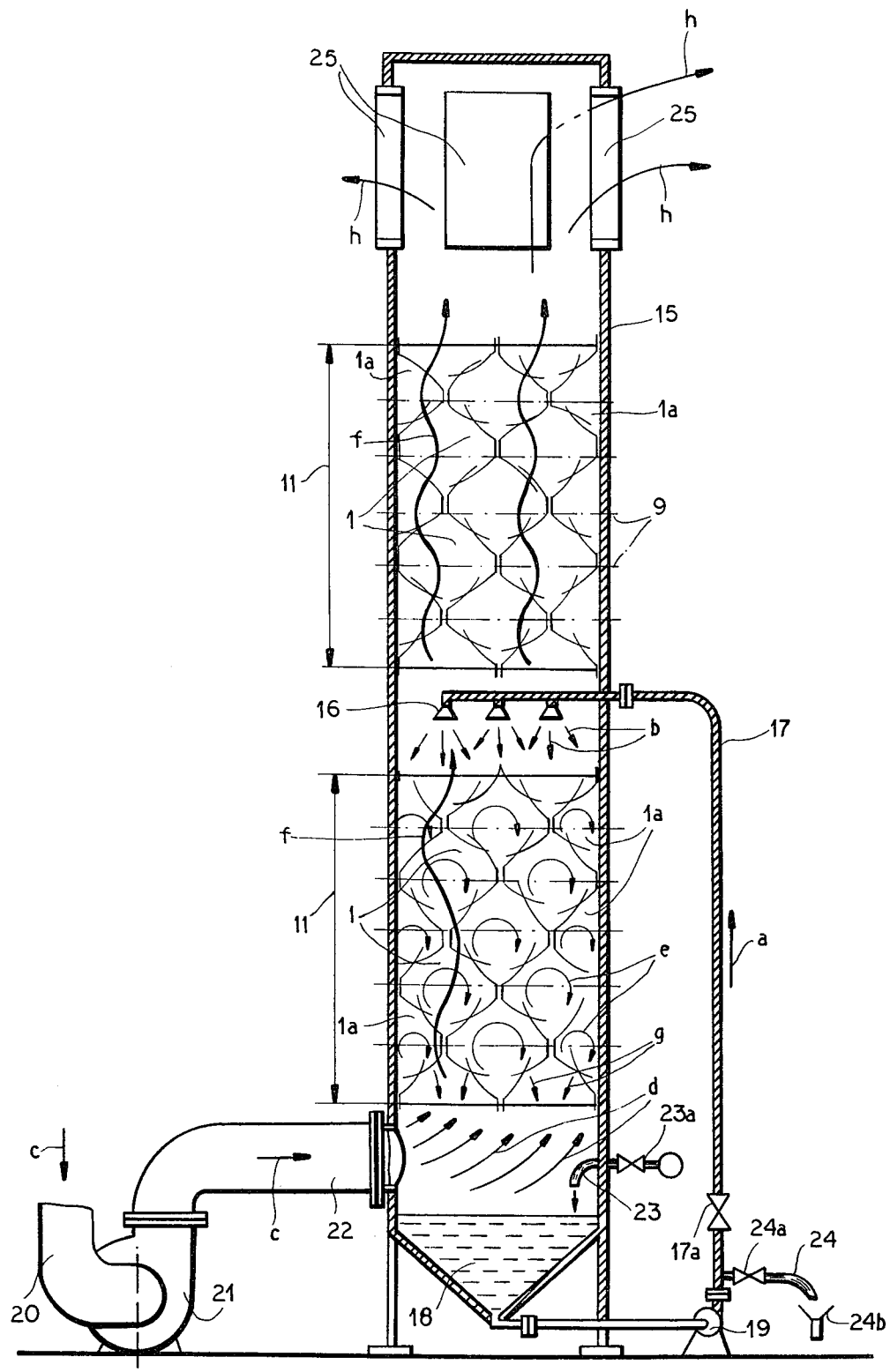
FIG. 5 is a diagrammatic vertical section of a column for contacting counterflowing liquid-gas, and drop separation, containing a packing as in FIGS. 1-4.

Section I of the apparatus shown in FIG. 5, i.e. a counterflow column, is sprinkled with liquid, while its section II does not receive extra liquid and has only a drop separating role. Sections I and II are located in a common rectangular column 15. The column sections I and II receive the previously described mainly hexagonal cross section cells 1 and, along the opposite walls of column 15, the open trapezoidal cross section cells 1a. The cell lines are fixed to the wall of column 15 by the described fixing-spacer device. The distribution heads or sprinklers 16 of the apparatus, for feeding the liquid into the apparatus are connected with liquid source 18 by pipe 17, and to a pump 19. The gaseous medium, in this case air, is sucked in through pipe 20 by ventilator 21 and is fed through stub 22 into the lower part of column section I. In case of necessity supplemental water can be fed through pipe 23 into tank 18. Pipe 24 is branched off from pipe 17, above pump 19, and opens into pipe 24b; a valve 24a is built into pipe 24, a valve 17a is provided above the branch off of pipe 24b in pipe 17 while a valve 24a is built into pipe 23. The purpose of pipe 24 is to drain the surplus liquid and to make the system fluid tight at stand-down.

There are openings 25 cut into the wall of column 15 above the column section II, through which the gas forced upwards in column sections I and II, may leave.

Operation of the equipment according to FIG. 5. is the following:

The liquid pump 19 and ventilator 21 are started, whereby liquid is fed through pipe 17 into distribution heads 16, in the direction of arrow a, from where the liquid in accordance with arrow b, reaches the top of the cells 1. The liquid leaves the column at the bottom of section I in the direction of arrow g.

At the same time gaseous medium is blown in the direction of arrows c and d, then upwards in the direction of f, through cells 1 of section I. Passage of the mediums—through cells 1 with their walls 2-5 (FIG. 1) running transversely to the flow direction (f,b,g) of both mediums is ensured by the mere presence of gaps 7 between teeth 6 (see FIGS. 1 and 4), with the gap width at 7 changing with tooth vibration so that flow of the medium is ensured.

Down-flow of the liquid and up-flow of the gaseous medium in the direction of arrow f brings the flexibly deformable teeth 6—made of thin plate material—into and keeps than in intensive vibration in the walls of cells 1 since the flowing medium gives impulses to these teeth (FIGS. 1 and 4). During vibration the teeth 6 bend alternately in two directions from their plane, thus the original, stationary gap cross section periodically increases. Cells 1 of FIG. 5 demonstrate the position of teeth 6 displaced from their own plane. While teeth 6 are in vibration, they react with the flowing liquid itself, and/or to the gas as well: teeth 6 atomize intensively and splash the liquid on cell walls 2-5 (FIG. 1) in every direction. They also keep the medium in cells 1—in case of suitable mass-flow—in turbulent, swirling motion, as demonstrated by arrows e. During these processes the liquid and gaseous mediums are in very effective contact with each other. Quick-moving liquid drops swirl in the gas flowing through the cells, or quick-moving gas bubbles swirl in the liquid flowing through the cells. The swirling motion of the gas-liquid mixture within the cells and its fast flow through the gaps, makes the phase contact very effective. The interface of the phases increases to a maximum. The kinetic energy of the medium, brings teeth 6 into vibration, and this vibration, induced without external energy supply, brings about the turbulent, swirling motion within the cells, considerably increasing the effectiveness of contacting the mediums, and the powerful splashing atomization of the liquid phase. It is easy to see that as a result of these phenomena, the velocity of the material and/or heat transfer in column section I is a maximum. It is noted that each gas particle passes upwards in cells 1, as on a "vortex-loop-type" track: it is in a swirling motion within the cells, then flows through into a further cell, receiving a swirling motion again, and thus passing on until it leaves the section at the top of section I.

The purpose of column section II is merely for drop separation: here the gas containing the liquid, flows upwards in the direction of arrows f, while it brings teeth 6 of cell walls 2-5 (FIGS. 1-4) into vibration; the liquid separates from the gas during the turbulent, swirling motion, passing downwards through cells 1 counter to the gas flow, then returns to section I. Thereafter the gas passes with reduced moisture content through openings 25 at the top of the column in the direction marked with arrows h into the open air.

The apparatus of FIG. 5 can be used as a water cooling tower, whereupon it functions as a mixer heat exchanger. In this case, the hot water of a power station is the liquid source 18, while the ambient air is conducted through duct 20 into section I of tower 15. The intensive mixing as described in detail, results in very high heat transfer velocities between the two phases, so that the tower containing the packing according to the invention, gives more favorable results than presently known packed towers, e.g. water loadability is higher and demand for specific ground area is less.

The unit of FIG. 5 can be used to advantage as a wet-washing tower for the purpose of dust control. The tower containing the packing according to the invention can be operated with low pressure drop even at high gas velocities. As a result of the swirling motion within cells 1 the dust-containing gas/liquid contact is intensive. Hence the dust (mechanical impurity) is washed out of the gas within a short distance. This means that dust control of the gas (air) can be solved with small equipment dimensions and with favorable operating characteristics. In this case the dust-containing gas, mainly air, is fed through duct 20 into section I of tower 15, while the washing water (or other type of washing liquid) is fed through pipe 17 and distribution heads 16 into column section I. Use of the drop-separating section is optional, i.e. it is not absolutely necessary, for cooling or dust separation, as well as in case of using the packing of the invention for other purposes.

The tower of FIG. 5 can be used to advantage also in case of absorption or chemisorption involving high heat evolution because the tower structure with a packing containing cells 1, operates favorably even with high liquid loading. Naturally in addition to these applications, the tower can be used for other contacting tasks, for instance for the introduction of oxygen into waste water; in this case the gaseous medium supplied from below, is oxygen, or perhaps air, while the liquid fed into the packing of section I, is waste water.

Figure 6:
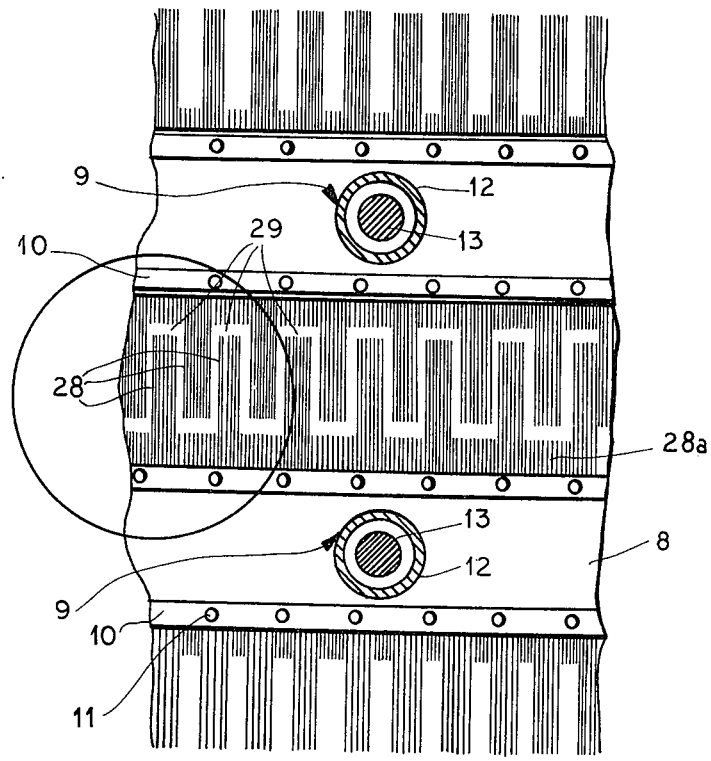
FIG. 6 is a developed view of the detail of a cell, the vibrating elements of which are formed by tongues consisting of console-type flexible strands.

FIG. 6 shows a cell wall in a view which corresponds to a detail of a side view similar to that of FIG. 4, and partly in section, where the console-type elements to be brought into and kept in vibration with flow of the medium, consist not of teeth 6 as shown in the embodiment of FIGS. 1–4, but of flexibly deformable, for instance steel wire strands, constituting strand tongues 28, running in two lines, and arranged in toothed formation. Strand tongues 28 of one row reach into the strand tongues 28 (tooth gaps) of the opposite row. There are gaps 29 between the adjacent strand tongues 28, or along the circumference of each strand tongue 28. Otherwise the cell itself, the walls of which have such strand tongues 28, is identical with the cells of FIGS. 1–4. Rows of the strand tongues in the region of the ends of straight sections 28a can be fastened by welding to fixing plate 10, which can be similarly fastened to the profile holding plates 8 by screws 1. The cells can be joined to the wall of a column with the fastening-spacer devices consisting of spacer pipes 12, and holding bar 13, the whole unit being represented at 9, so that strand tongues 28 too can be used, even within each wall, instead of or alternating with teeth 6 in the walls of the cells constituting the packing of the equipment of FIG. 5.

Figure 7:
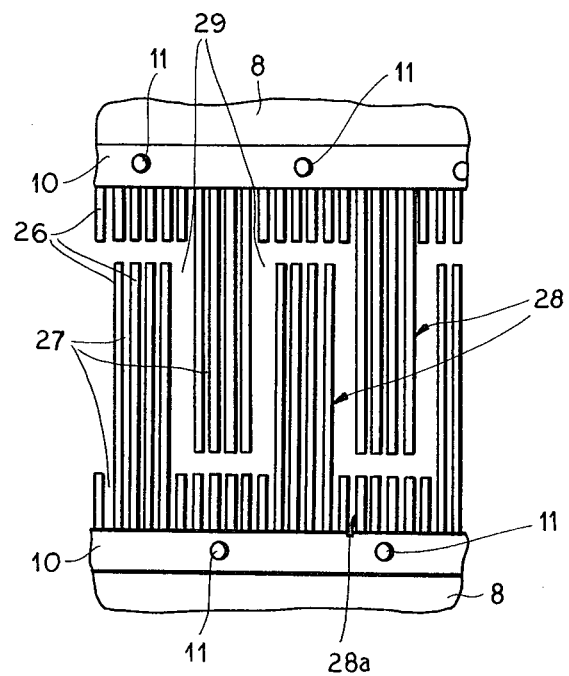
FIG. 7 is an enlarged view of detail C of FIG. 6.

FIG. 7 is an enlarged view of section c of FIG. 6. The Figure shows that the strand tongues 28, separated from each other with gaps 29, as well as the straight sections 28a consist of wire strands 26 separated from each other by gaps 27. Thus flow of the medium through the cell walls is ensured, and as a result of the flow of medium the wire strands 26 vibrate just as do the teeth 6. Consequently the intensive mixing between the liquid and gaseous phases is ensured with the system of FIGS. 6 and 7.

Figure 8:
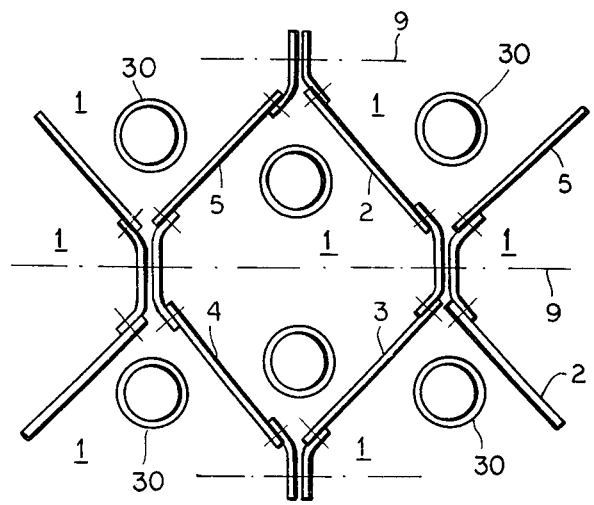
FIG. 8 is a detail of such honeycomb-shaped packing in vertical cross section, which contains heat exchanger pipes.

FIG. 8 shows the use of the packing of the invention for surface heat exchangers.

Pipes 30 run in cells 1 of the packing built into a column (not shown), with a honeycomb structure similar to that of FIG. 2 the walls 2–5 of which may contain teeth 6 or wire strands 26 as vibrating elements.

One of the mediums, for instance the hot water to be cooled, or vapor to be condensed flows in pipes 30, while the further medium or mediums, for instance cold water and the counterflowing, upwardly conducted ambient air flow through cells 1, mounted in the column. In this latter case a three-medium surface heat exchanger is provided. The advantage of this embodiment is, that heat transfer outside pipes 30 as a result of the intensive contact, can have a very favorable value, i.e. effectiveness of the heat exchange can be considerably increased with energy savings.

Flow of only cold water, or only ambient air through the cells containing pipes 30 is also feasible. In this case two-medium surface heat exchanger is effected.

Naturally the system of FIG. 8 is not restricted to the described application possibilities, but it is suitable for the formation of the following economical surface heat exchangers: a liquid cooler in a closed system; a liquid heater in a closed system; gas cooler and gas heater; condenser; and evaporator.

Figure 9:
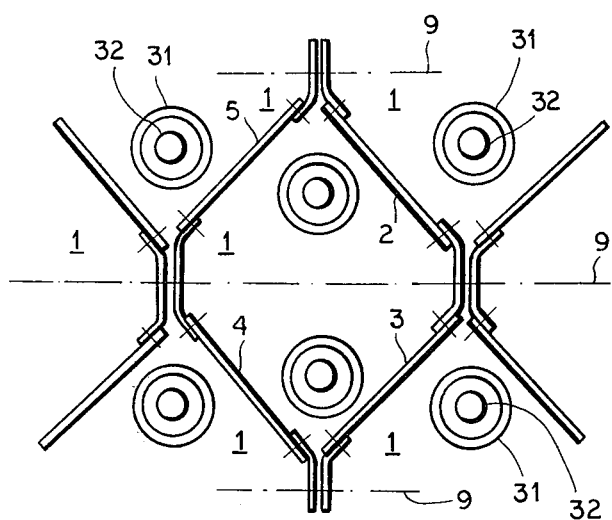
FIG. 9 is a detail of such honeycomb-shaped packing in vertical cross section, which contains pipes suitable for photochemical reaction.

The device of FIG. 9 differs from that of FIG. 8 in that instead of pipes 30 in cells 1 serving for the conduction of the medium to be cooled, burners 32 (ultraviolet, natural or infrared light emitters) are surrounded with glass, or quartz tubes 31 are placed in the cells. This way the column containing the packing is also a reactor suitable for carrying out a photochemical reaction. Illuminating the reaction mixture—in cells with intensive turbulent flow outside the pipes—with burners 32 in pipes 31, can yield industrially important photoreactions. Thus for instance side-chain halogenation of the aromatic compounds can be carried out; with photosulf-oxidation and photosulf-chlorination, washing and wetting agents and tanning materials can be produced.

Figure 10:
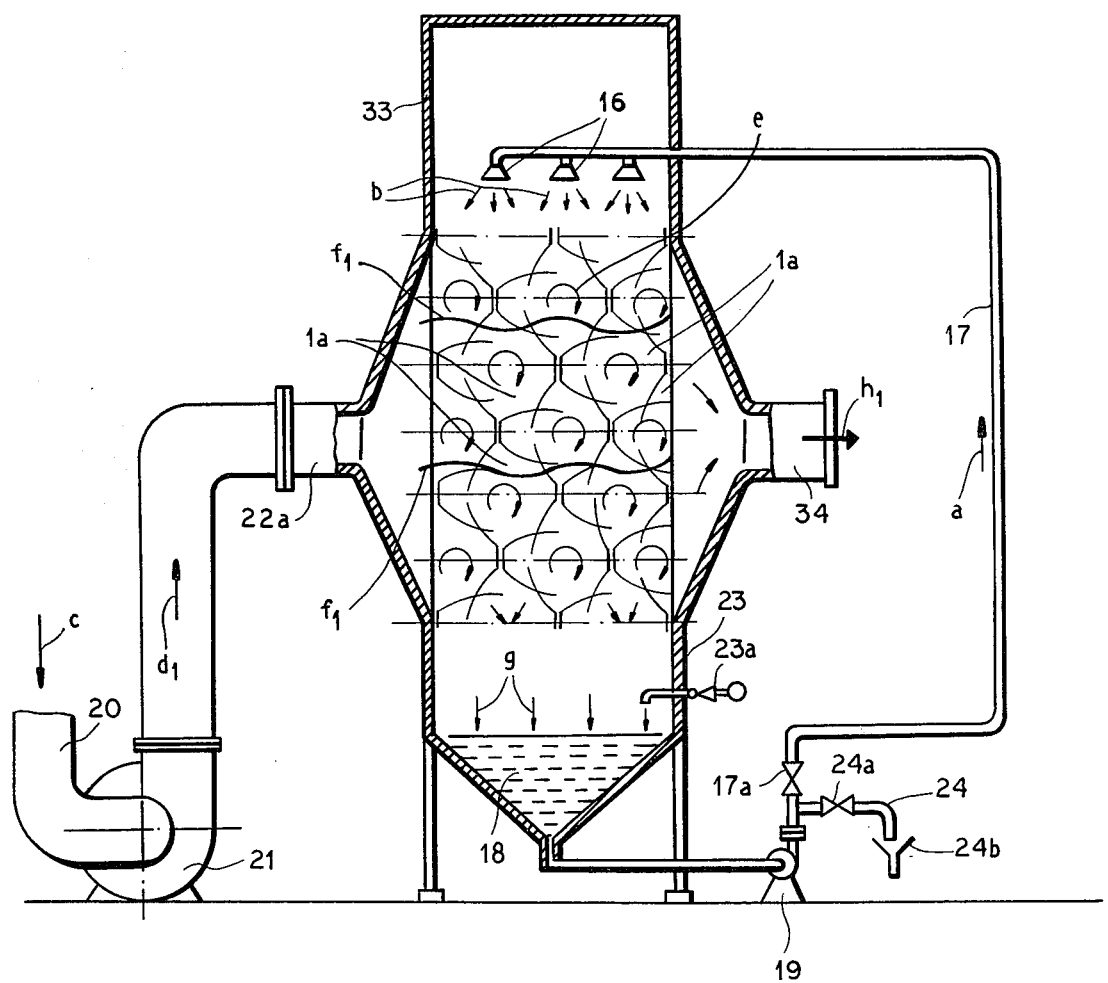
FIG. 10 is a diagrammatic vertical section of a crosswise flowing liquid-gas contacting equipment, containing packing as in FIGS. 1-4.

FIG. 10 shows a cross-flow column 33 containing a packing of cells 1, according to the invention. The structure of column 33 is the same in many respect as that of the column of FIG. 5, hence the arrows indicating the identical structural elements and flow directions are indicated with the previously used reference characters. The difference is that column 33 has no drop separating section, and the gas phase inlet stub 22a enters the column section containing cells 1, from the side the liquid is fed through distribution heads 16, and an outlet stub 34 is provided on the side of column 33 opposite stub 22. Direction of the gas flow is denoted with arrow $d_1$, the gas outlet is shown by arrow $h_1$, while the transversal flow direction of the gas within the interior of the packing is shown with arrows $f_1$. It is evident, that the mediums are in intensive turbulent-swirling motion (arrows c) in cells 1 of column 15 in FIG. 5, since flow of the medium keeps the teeth 6 in the cell walls or/and the wire strands 26 in vibration, as detailed before. Thus the packing according to the invention can be used the cross-flow liquid/gas contacting equipment too.

Figure 11:
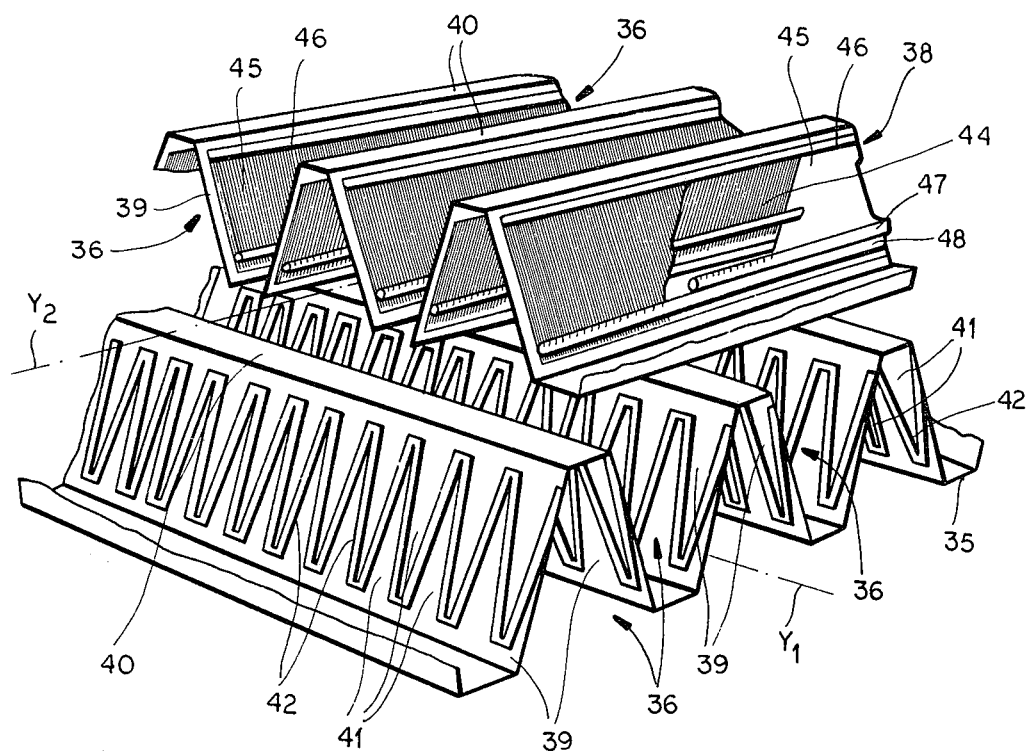
FIG. 11 is a perspective view of such packing according to the invention, which is formed by sloping plates, transversal above each other, containing vibrating elements.

Detail of another packing according to the invention for contacting gas and liquid is shown in perspective view in FIG. 11. This packing consists of packing units 37, 38 containing adjacent and parallel channels 36, of trapezoid section, continuously passing through each other in cross section, open alternately at the bottom and top, formed by continuous plate 35. Contacting of the liquid and gaseous mediums takes place mainly in these channels. Spaces of the channels 36,—running above each other, open alternately upwards and downwards—and direct flow into each other. The longitudinal axes $Y_1$, $Y_2$ of channels 36 of packing units 37, 38—i.e. the axes parallel with the channel walls,—run transversely to each other, at a right angle in the illustrated embodiment. The inclined side panels 39 of channels 36 contain vibratile elements made of flexibly deformable material, which can be brought into and kept in vibration by the liquid and/or gaseous medium flowing through the packing, and which are provided with gaps between them. These vibrating elements, in case of the channels 36 of packing unit 37, are formed by sawtooth-shaped teeth 41 located in lines opposite each other, with gaps 42 between them. Teeth of the lines opposite each other reach into the tooth gaps of the opposite line. Teeth 41 are cut out of the plate material of wall 39. The vibrating elements of channels 36 of packing unit 38 are formed by wire strands 43 made of similarly flexibly deformable material, with gaps 44 between them. These wire strands are interdigitated in comb configuration in openings 45 formed in walls 39, with their upper end fixed to holding strips 46, while the lower end reaches the lower edge of opening 45. Stop strips 47 and 48 are fixed at the bottom on both sides of the strand line consisting of wire strands 43, the role of which is to prevent the excessive swing of wire strands 43. Part of the wire strands 43 in FIG. 11 has been removed from one of the channel walls 39 in the interest of better view, and only part of the stop strips 47 and 48 is shown. Stop strips 47 and 48 can be fixed to the column walls (not shown).

Packing units 37, 38 are seated on each other, or the supporting structure of the lowest packing unit (not shown) on the horizontal panels 40 of the trapezoid sectional channels. The seating may be direct, but underplates can be inserted if desired between the packing units.

The packing of FIG. 11 differs from the packings of FIGS. 1–4 and 6–7 inasmuch as it is formed by channels instead of a cell or cells. However it is the same in respect of the channel walls being of flexibly deformable material, containing elements brought into and kept in vibration with a flowing medium, or mediums-,—i.e. teeth 41 of FIG. 11 correspond to teeth 6 of FIG. 1, and wire strands 43 correspond to the wire strands of FIGS. 6 and 7. Vibration of the elements in the packing of FIG. 11 results in the powerful dynamic effect in the contact of gas and vapor; the liquid droplets splashed by the vibrating elements bump against each other with force, a secondary atomization effect appears as a result of the moving drops bumping against each other, residence time of the liquid in the packing increases, thus passage of the gas through the very effectively atomized liquid medium takes relatively long time. Thus effectiveness of the contact and velocity of the heat- and/or material transfer is high. Naturally the channel-type packing of FIG. 11 can be likewise built into any gas liquid contact equipment, e.g. in place of cells 1 in columns of FIGS. 5 and 10; moreover they can be used alternately with them as well.

Naturally the channel-type packing is not restricted to the solution of FIG. 11, but it can be realized in several alternatives within the protected circle defined by the claims. The flexibly deformable console-type elements of packing units 37, 38 within the same packing are practically identical, the two types of the vibrating element solution of FIG. 11—although their use is not excluded—it is assumed that their use will rarely occur.

The cross sectional shape of the packing units can be realized in several varieties different from that of FIG. 11. Cross section of the channels can be for instance triangular, in which case the cross section of the complete packing unit is ziz-zag-shaped. The use of channels with an arched wall is not excluded either, in which case the cross section of the complete packing unit is of wave shape. It is practicable, if the packing units containing the channels are formed by a single plate bent to suitable profile, although each packing unit can be assembled from several parts, for them to be incorporated in the column either by fastening them to each other, or in independent arrangement.

It is noted that the packing of FIG. 11 also can be used in surface heat exchangers or in a photochemical reactor.

Furthermore it is noted that the $Y_1$, $Y_2$ axes of the packing units can be arranged not only in a horizontal position, but at an angle to the vertical as well, i.e. the channels can run side by side in lines at an angle.

While the packings of FIGS. 1–4 are primarily suitable for chemical reactions, the packing of FIG. 11 yield the best results if built into cooling towers, drop separators, dedusters, etc. However, it is necessary to emphasize that both the packings of FIGS. 1–4 and that of FIG. 11 are eminently suitable for every kind of liquid gas contacting purpose, and the concrete task and conditions will always decide, which solution—perhaps the combination of the two: cell and channel-type packings—will be applicable.

What we claim is:

1. A column or tower packing adapted to be traversed by at least one fluid which comprises a stack of superposed layers of mutually parallel channels with the channels of one layer extending transversely to the channels comprising a pair of walls inclined to one another and joined by an imperforate third wall to form a small base and diverging legs of a trapezoidal profile of the channel, the walls of each pair being dentate and formed with a multiplicity of spaced-apart vibratile elements interdigitating with but spaced from corresponding vibratile elements reaching in opposite direction to the first mentioned vibratile elements on the respective wall, said elements being dimensioned to be set into vibration by the passage of said fluid through the packing, each of said layers having a corrugated profile corresponding to a respective series of trapezoidal profiles of the respective channels.

2. The packing defined in claim 1 wherein said vibratile elements are teeth formed from flexibly deformable plate.

3. The packing defined in claim 2 wherein the elements are cut out of material of the respective walls of the pairs in a saw-tooth like formation.

4. The packing defined in claim 1 wherein said elements are strands of flexibly deformable wire.

5. The packing defined in claim 4 wherein said strands are each fixed by only one of their ends to the third wall of the respective channel.

6. The packing defined in claim 5, further comprising stop strips extending along each channel in the region of a free end of the respective strands for limiting the displacement of the free end thereof.

7. The packing defined in claim 1 wherein each of said channels has a trapezoidal corrugated cross section opening alternately upwardly and downwardly.

8. The packing defined in claim 1, further comprising a pipe extending along said channels for carrying a medium into said packing.

9. The packing defined in claim 1 wherein said packing forms part of a reactor, further comprising reaction-promoting burners in said channels.

* * * * *